United States Patent
Rader

(10) Patent No.: US 9,455,922 B2
(45) Date of Patent: Sep. 27, 2016

(54) TECHNOLOGIES FOR MODERATING PACKET INGRESS INTERRUPT GENERATION

(71) Applicant: Intel Corporation, Santa Clara, CA (US)

(72) Inventor: Shawn T. Rader, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 14/280,988

(22) Filed: May 19, 2014

(65) Prior Publication Data

US 2015/0334025 A1 Nov. 19, 2015

(51) Int. Cl.
*H04L 12/801* (2013.01)
*G06F 13/32* (2006.01)
*H04L 12/64* (2006.01)

(52) U.S. Cl.
CPC ............ *H04L 47/193* (2013.01); *G06F 13/32* (2013.01); *H04L 12/6418* (2013.01)

(58) Field of Classification Search
CPC .................................................. H04L 47/193
See application file for complete search history.

(56) References Cited

U.S. PATENT DOCUMENTS

| | | | | |
|---|---|---|---|---|
| 5,757,801 A * | 5/1998 | Arimilli | ............... | H04J 3/1688 370/444 |
| 6,981,084 B2 | 12/2005 | Connor | | |
| 8,244,946 B2 | 8/2012 | Gupta et al. | | |
| 2007/0110053 A1 * | 5/2007 | Soni | ................... | H04L 63/0263 370/389 |
| 2012/0254492 A1 | 10/2012 | Li et al. | | |
| 2014/0006667 A1 * | 1/2014 | Sun | ......................... | G06F 13/24 710/261 |
| 2014/0040514 A1 * | 2/2014 | Li | ........................... | G06F 13/24 710/48 |
| 2015/0286594 A1 * | 10/2015 | Degani | .................. | G06F 13/24 710/261 |

OTHER PUBLICATIONS wikipedia.org, "Datagram," Wikipedia, The Free Encyclopedia, retrieved from: <http://en.wikipedia.org/w/index.php?title=Datagram&oldid=579451766>, edited Oct. 30, 2013, 3 pages.

Qualcomm Atheros, Inc., "Killer™ Technology—Advanced Stream Detect," retrieved from: <http://www.qca.qualcomm.com/products/killer-technology/technology/advanced-stream-detect>, 2014, 1 page.

wikipedia.org, "Protocol data unit," Wikipedia, The Free Encyclopedia, retrieved from: <http://en.wikipedia.org/w/index.php?title=Protocol_data_unit&oldid=598220180>, edited Mar. 5, 2014, 3 pages.

(Continued)

*Primary Examiner* — Jason Mattis
(74) *Attorney, Agent, or Firm* — Barnes & Thornburg LLP

(57) ABSTRACT

Technologies for generating an interrupt for moderating generation of packet ingress interrupts includes a local computing device to receive a network packet from a remote computing device. The local computing device examines a header field of a transport layer protocol data unit of the received network packet to determine a size parameter. A network socket throughput between the local computing device and the remote computing device is determined based on communications between the local computing device and the remote computing device. The local computing device determines an interrupt rate based on the determined size parameter and the network socket throughput. An interrupt is generated based on the determined interrupt rate to allow processing of the received network packet.

20 Claims, 6 Drawing Sheets

(56) References Cited

OTHER PUBLICATIONS wikipedia.org, "Measuring network throughput," Wikipedia, The Free Encyclopedia, retrieved from: <http://en.wikipedia.org/w/index.php?title=Measuring_network_throughput&oldid=598780039>, edited Mar. 9, 2014, 6 pages.

wikipedia.org, "User Datagram Protocol," Wikipedia, The Free Encyclopedia, retrieved from: <http://en.wikipedia.org/w/index.php?title=User_Datagram_Protocol&oldid=599183750>, edited Mar. 11, 2014, 6 pages.

wikipedia.org, "Internet Protocol," Wikipedia, The Free Encyclopedia, retrieved from: <http://en.wikipedia.org/w/index.php?title=Internet_Protocol&oldid=599818456>, edited Mar. 16, 2014, 4 pages.

wikipedia.org, "Type of service," Wikipedia, The Free Encyclopedia, retrieved from: <http://en.wikipedia.org/w/index.php?title=Type_of_service&oldid=600170288>, edited Mar. 18, 2014, 2 pages.

wikipedia.org, "Transmission Control Protocol," Wikipedia, The Free Encyclopedia, retrieved from: <http://en.wikipedia.org/w/index.php?title=Transmission_Control_Protocol&oldid=601049434>, edited Mar. 24, 2014, 18 pages.

wikipedia.org, "Network socket," Wikipedia, The Free Encyclopedia, retrieved from: <http://en.wikipedia.org/w/index.php?title=Network_socket&oldid=601392842>, edited Mar. 26, 2014, 5 pages.

wikipedia.org, "Transport layer," Wikipedia, The Free Encyclopedia, retrieved from: <http://en.wikipedia.org/w/index.php?title=Transport_layer&oldid=601539475>, edited Mar. 27, 2014, 4 pages.

wikipedia.org, "Internet protocol suite," Wikipedia, The Free Encyclopedia, retrieved from: <http://en.wikipedia.org/w/index.php?title=Internet_protocol_suite&oldid=601729832>, edited Mar. 28, 2014, 8 pages.

wikipedia.org, "OSI model," Wikipedia, The Free Encyclopedia, retrieved from: <http://en.wikipedia.org/w/index.php?title=OSI_model&oldid=602276716>, edited Apr. 1, 2014, 9 pages.

* cited by examiner

TECHNOLOGIES FOR MODERATING PACKET INGRESS INTERRUPT GENERATION

BACKGROUND

A network interface of a computing device may receive hundreds—and, in some instances, hundreds of thousands or millions—of network packets per second during periods of high packet ingress. Likewise, during periods of low packet ingress, the same network interface may only receive network packets a rate of only a few packets per second. In either case, the network interface asserts a packet ingress interrupt to signal the receipt of network packets to a network driver, a protocol stack, and/or applications of the computing device that need the packet data. In many applications, such as, for example, in highly pipelined processors, interrupts are inefficient, and a high rate of interrupt generation can drastically increase the load on the processors of the computing device.

During periods of high packet ingress, in which a corresponding large number of interrupts are generated, the processors are highly utilized for interrupt processing. In such cases, the processors may not have enough bandwidth to service all of the received packets. Additionally, the processing resources available to other system components (e.g., the protocol stack, operating system, and application programs) are reduced. Further, a high rate of packet ingress (and the corresponding high rate of interrupt generation) can lead to delays in sending acknowledgements and may cause subsequently received packets to be lost. Thus, a high rate of interrupt generation due to packet ingress can reduce overall throughput and system reliability.

To alleviate the problems associated with high packet ingress rates, some network interfaces moderate the assertion of interrupts. Interrupt moderation typically enables a single interrupt to signal receipt of multiple packets, thereby reducing the number of interrupts generated during periods of high packet ingress. As such, interrupt moderation may be useful for high-speed applications. However, interrupt moderation may be less useful during periods of low packet ingress. During such periods, interrupt moderation may add latency and reduce network throughput because a received network packet may be required to wait for assertion of an interrupt until additional packets have been received.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
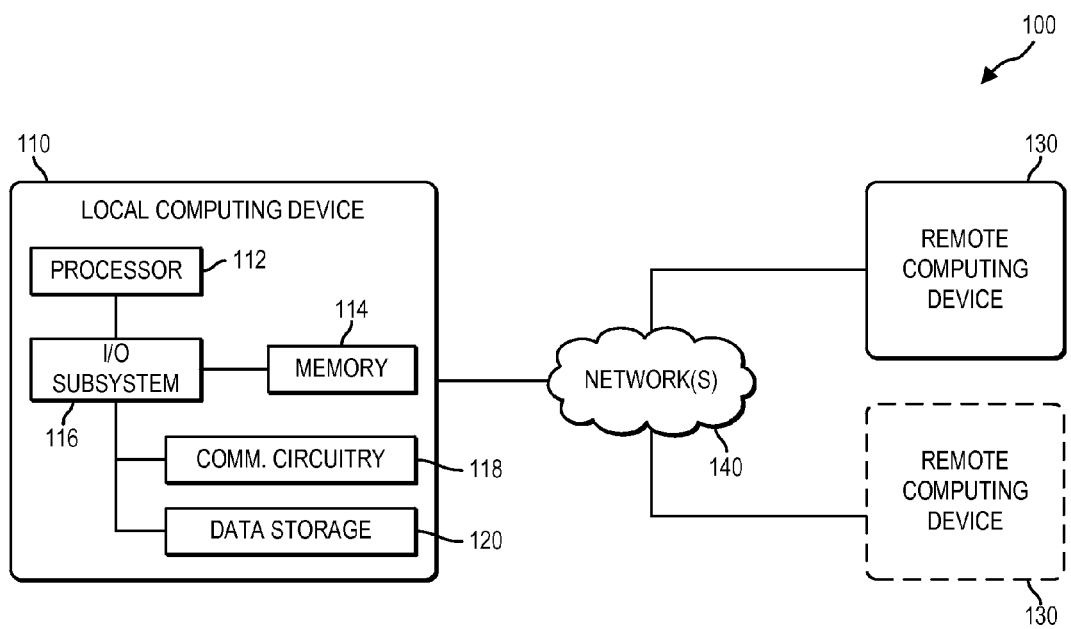
FIG. 1 is a simplified block diagram of at least one embodiment of a system for moderating generation of packet ingress interrupts.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for moderating generation of packet ingress interrupts includes a "local" computing device 110 and a "remote" computing device 130, which communicate with each other over one or more networks 140. In some embodiments, the system 100 may include more than one remote computing device 130. As such, the local computing device 110 may communicate with any number of remote computing device(s) 130 over the network(s) 140. In use, the local computing device 110 may receive one or more network packets (e.g., frames, cells, etc.) from the remote computing device 130 via the network(s) 140. In response to receipt of the network packet, the local computing device 110 is configured to examine a transport layer header field of the received network packet to determine a size parameter. The size parameter corresponds to a parameter (e.g., a transmission control protocol (TCP) receive window size, a TCP window scale value, etc.) of the remote computing device 130 from which the network packet originated and/or a parameter of the network packet itself (e.g., a user datagram protocol (UDP) datagram length, etc.). In addition to determining the size parameter, the local computing device 110 is configured to determine a throughput of a network socket (e.g., stream socket, datagram socket, raw socket, etc.) and/or connection between the local computing device 110 and the remote computing device 130. The local computing device 110 is also configured to determine an interrupt rate based at least in part on, or otherwise as a function of, the determined size parameter and the network socket throughput. The interrupt rate is indicative of a frequency at which packet ingress interrupts should be generated by one or more components (e.g., a network interface card, a driver, or any other type of communication circuitry 118, component, and/or module) of the local computing device 110. Such packet ingress interrupts may be used to notify or otherwise inform other components (e.g., the processor 112, a driver, an operating system, and/or any other circuitry, component, or module) of the local computing device 110 that one or more network packets have been received and are available for further processing. As such, it should be appreciated that the interrupt rate generated or otherwise determined by the local computing device 110 may be the optimal rate at which interrupts should be generated to prevent network packets (e.g., frames, cells, etc.) from being dropped and/or prevent the processing resources available to other system components (e.g., the protocol stack, operating system, and application programs) from being reduced.

The local computing device 110 may be embodied as, or otherwise include, any type of computing device capable of performing the functions described herein including, but not limited to a desktop computer, a laptop computing device, a server computer, a consumer electronic device, a mobile computing device, a mobile phone, a smart phone, a tablet computing device, a personal digital assistant, a wearable computing device, a smart television, a smart appliance, and/or other type of computing device. The illustrative local computing device 110 includes a processor 112, a memory 114, an input/output (I/O) subsystem 116, communication circuitry 118, and a data storage 120. Of course, the local computing device 110 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 114, or portions thereof, may be incorporated in the processor 112 in some embodiments.

The processor 112 may be embodied as any type of processor capable of performing the functions described herein. For example, the processor 112 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the local computing device 110 such as operating systems, applications, programs, libraries, and drivers. The memory 114 is communicatively coupled to the processor 112 via the I/O subsystem 116, which may be embodied as circuitry and/or components to facilitate input/output operations with the processor 112, the memory 114, and other components of the local computing device 110. For example, the I/O subsystem 116 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 116 may form a portion of a system-on-a-chip (SoC) and be incorporated, along with the processor 112, the memory 114, and other components of the local computing device 110, on a single integrated circuit chip.

The communication circuitry 118 of the local computing device 110 may be embodied as any type of communication circuit, device, or collection thereof, capable of enabling communications between the local computing device 110 and the remote computing device(s) 130 and/or other computing devices via the network(s) 140. The communication circuitry 118 may be configured to use any one or more communication technologies (e.g., wireless or wired communications) and associated protocols (e.g., Ethernet, Wi-Fi®, WiMAX, etc.) to effect such communication.

The data storage 120 may be embodied as any type of device or devices configured for short-term or long-term storage of data such as, for example, memory devices and circuits, memory cards, hard disk drives, solid-state drives, or other data storage devices. For example, the data storage 120 may be configured to store one or more operating systems to be initialized and/or executed by the local computing device 110. In some embodiments, portions of the operating system(s) may be copied to the memory 114 during operations for faster processing and/or any other reason.

As discussed above, the local computing device 110 may communicate with the remote computing device(s) 130 over the network(s) 140. The network(s) 140 may be embodied as any number of various wired and/or wireless communication networks. For example, the network(s) 140 may be embodied as or otherwise include a local area network (LAN), a personal area network (PAN), a wide area network (WAN), a cellular network, or a publicly-accessible, global network such as the Internet. Additionally, the network(s) 140 may include any number of additional devices to facilitate communication between the local computing device 110, the remote computing device(s) 130, and other devices of the system 100 as discussed below.

The remote computing device(s) 130 may be embodied as, or otherwise include, any type of computing device capable of performing the functions described herein including, but not limited to a desktop computer, a laptop computing device, a server computer, a consumer electronic device, a mobile computing device, a mobile phone, a smart phone, a tablet computing device, a personal digital assistant, a wearable computing device, a smart television, a smart appliance, and/or other type of computing device. As such, the remote computing device(s) 130 may include devices and structures commonly found in computing devices such as processors, memory devices, communication circuitry, and data storages, which are not shown in FIG. 1 for clarity of the description. In some embodiments, the remote computing device 130 may be configured to transmit packets (e.g., frames, cells, etc.) to the local computing device 110 via the network(s) 140 and/or receive network packets (e.g., frames, cells, etc.) from the local computing device 110 via the network(s) 140. In such embodiments, the network packets transmitted to and/or received from the local computing device 110 may each include or otherwise encapsulate a transmission control protocol (TCP) segment, a user datagram protocol (UDP) datagram, or any other type transport layer protocol data unit.

Figure 2:
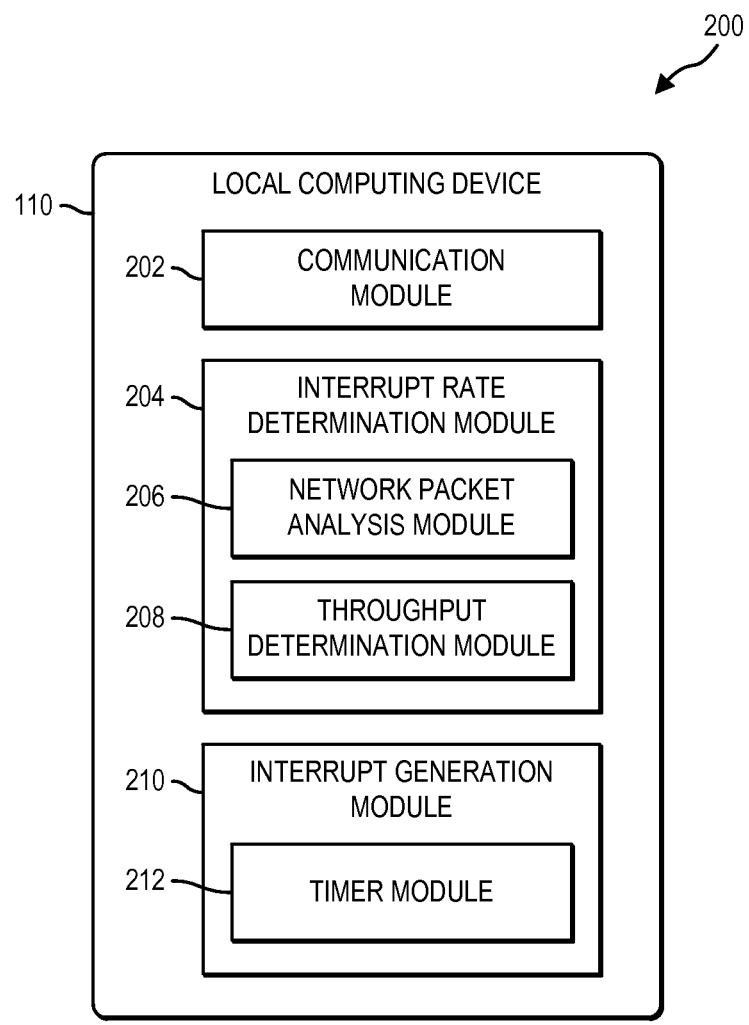
FIG. 2 is a simplified block diagram of at least one embodiment of an environment of the computing device of FIG. 1.

Referring now to FIG. 2, in use, the local computing device 110 establishes an environment 200 during operation. The illustrative environment 200 includes a communication module 202, an interrupt rate determination module 204, and an interrupt generation module 210. As discussed in more detail below, the interrupt rate determination module 204 of the illustrative embodiment shown in FIG. 2 includes a network packet analysis module 206 and a throughput determination module 208. In addition, the interrupt generation module 210 of the illustrative embodiment shown in FIG. 2 includes a timer module 212. Each of the modules, logic, and other components of the environment 200 may be embodied as hardware, software, firmware, or a combination thereof. It should be appreciated that the local computing device 110 may include other components, sub-components, modules, and devices commonly found in a computing device, which are not illustrated in FIG. 2 for clarity of the description.

The communication module 202 of the local computing device 110 facilitates communications between components or sub-components of the local computing device 110 and the remote computing device(s) 130. For example, in some embodiments, the communication module 202 may facilitate establishing network sockets (e.g., stream sockets, datagram sockets, raw sockets, etc.), connections, and/or flows with the remote computing device 130 via the network 140, receiving network packets (e.g., frames, cells, etc.) from the remote computing device 130, and/or transmitting networks packets (e.g., frames, cells, etc.) to the remote computing device 130.

The interrupt rate determination module 204 is configured to determine an interrupt rate to moderate the generation of one or more packet ingress interrupts. To do so, the interrupt rate determination module 204 is configured to examine transport layer header fields of the network packets transmitted to and/or received from the remote computing device(s) 130. In some embodiments, the interrupt rate determination module 204 is configured to determine the interrupt rate based on, or otherwise as a function of, a size parameter obtained from a transport layer header field of a received network packet and a network socket throughput determined from communications between the local computing device 110 and the remote computing device 130. It should be appreciated that the interrupt rate determined by the interrupt rate determination module 204 may be the optimal rate at which interrupts should be generated to prevent network packets (e.g., frames, cells, etc.) from being dropped and/or prevent the processing resources available to other system components (e.g., the protocol stack, operating system, and application programs) from being reduced.

As discussed, as shown in the illustrative embodiment of FIG. 2, the interrupt rate determination module 204 includes the network packet analysis module 206 and the throughput determination module 208. The network packet analysis module 206 of the interrupt rate determination module 204 may be configured to analyze or otherwise examine network packets transmitted to the remote computing device 130 by the local computing device 110. Additionally or alternatively, the network packet analysis module 206 may be configured to analyze or otherwise examine network packets received from the remote computing device 130 by the local computing device 110. In some embodiments, the network packets received from and/or transmitted to the remote computing device 130 may include or otherwise encapsulate a transport layer protocol data unit (PDU). The transport layer PDU may be embodied as any type of PDU for enabling network communications between the local computing device 110 and the remote computing device 130 according to the seven-layer Open Systems Interconnection (OSI) model, the four-layer Internet protocol suite (e.g., the TCP/IP model), and/or any other type of communication model or protocol suite. For example, in some embodiments, the transport layer PDUs of the transmitted and/or received network packets may be embodied as transmission control protocol (TCP) segments and/or user datagram protocol (UDP) datagrams. In such embodiments, the network packet analysis module 206 is configured to examine header fields of the received network packets to determine the size parameter. For example, in embodiments wherein a received network packet includes a TCP segment, the network packet analysis module 206 may be configured to examine a header field of the TCP segment to determine a receive window size and/or a window scaling value. Additionally or alternatively, in embodiments wherein a received network packet includes a UDP datagram, the network packet analysis module 206 may be configured to examine a header field of the UDP datagram to determine a length of the UDP datagram.

The throughput determination module 208 of the interrupt rate determination module 204 may be configured to determine a network socket throughput between the local computing device 110 and the remote computing device 130. In some embodiments, the throughput determination module 208 determines the network socket throughput based on current (e.g., existing, present, active, ongoing, etc.) and/or historical (e.g., previous, inactive, etc.) network communications, network sockets, network connections, and/or network flows between the local computing device 110 and the remote computing device 130. For example, in some embodiments, the throughput determination module 208 may measure a current network throughput between the local computing device 110 and the remote computing device 130. In another embodiment, the throughput determination module 208 may calculate the network socket throughput based at least in part on, or otherwise as a function of, information (e.g., timestamps, time to live data, etc.) included in network packets sent/received by the local computing device 110 to/from the remote computing device 130. Additionally or alternatively, the throughput determination module 208 may calculate the network socket throughput based at least in part on, or otherwise as a function of, a network counter. For example, in some embodiments, the throughput determination module 208 may add the packet size of each network packet transmitted and/or received by the local computing device 110 to a network packet size counter. After a predefined or reference time interval (e.g., one second, two seconds, etc.) has elapsed, the throughput determination module 208 may divide the value of the network packet size counter by the amount of time elapsed, which may be equivalent or substantially similar to the predefined or reference time interval. The throughput determination module 208 may also be configured to determine the maximum throughput of a network socket and/or network flow between the local computing device 110 and the remote computing device 130. To do so, the throughput determination module 208 may determine the maximum throughput (e.g., the greatest throughput, the highest throughput, etc.) previously measured or otherwise calculated between the local computing device 110 and the remote computing device 130.

The interrupt generation module 210 is configured to generate packet ingress interrupts based on the determined interrupt rate. The packet ingress interrupts are used to notify or otherwise inform other components (e.g., the processor 112, a driver, an operating system, and/or any other circuitry, component, or module) of the local computing device 110 that one or more network packets have been received and are available for further processing. As discussed, the determined interrupt rate may be indicative of a frequency (e.g., how often) and/or an amount of time that should elapse until a packet ingress interrupt is generated. As such, in some embodiments, the interrupt generation module 210 generates a packet ingress interrupt based on determining that an amount of time equal to the determined interrupt rate has passed. For example, in embodiments wherein the interrupt rate determination module 204 determines an interrupt rate of 10.2 ms, the interrupt generation module 210 may generate a packet ingress interrupt in response to determining that 10.2 ms have elapsed since initialization of the local computing device 110 and/or since the last packet ingress interrupt was generated.

As discussed, as shown in the illustrative embodiment of FIG. 2, the interrupt generation module 210 includes the timer module 212. The timer module 212 may be configured to keep track of an amount of time that has passed since a packet ingress interrupt has been generated. To do so, the timer module 212 may utilize any number of timers, clock signals, counters, algorithms, or any other component of the local computing device 110 suitable for determining the passage of time. In some embodiments, the timer module 212 may determine an amount of time that has passed (e.g., counting up) since the occurrence of a particular event such as, for example, the generation of an interrupt, initialization of the local computing device 110, and/or establishment of a network socket, a network connection, and/or a network flow. In other embodiments, the timer module 212 may determine an amount of time remaining (e.g., counting down) until the occurrence of an event such as, for example, the amount of time remaining until the next interrupt is generated. In such embodiments the timer module 212 may be configured to determine the amount of time remaining based on, or otherwise as a function of, the interrupt rate and/or aggregate interrupt rate generated by the interrupt rate determination module 204.

Figure 3:
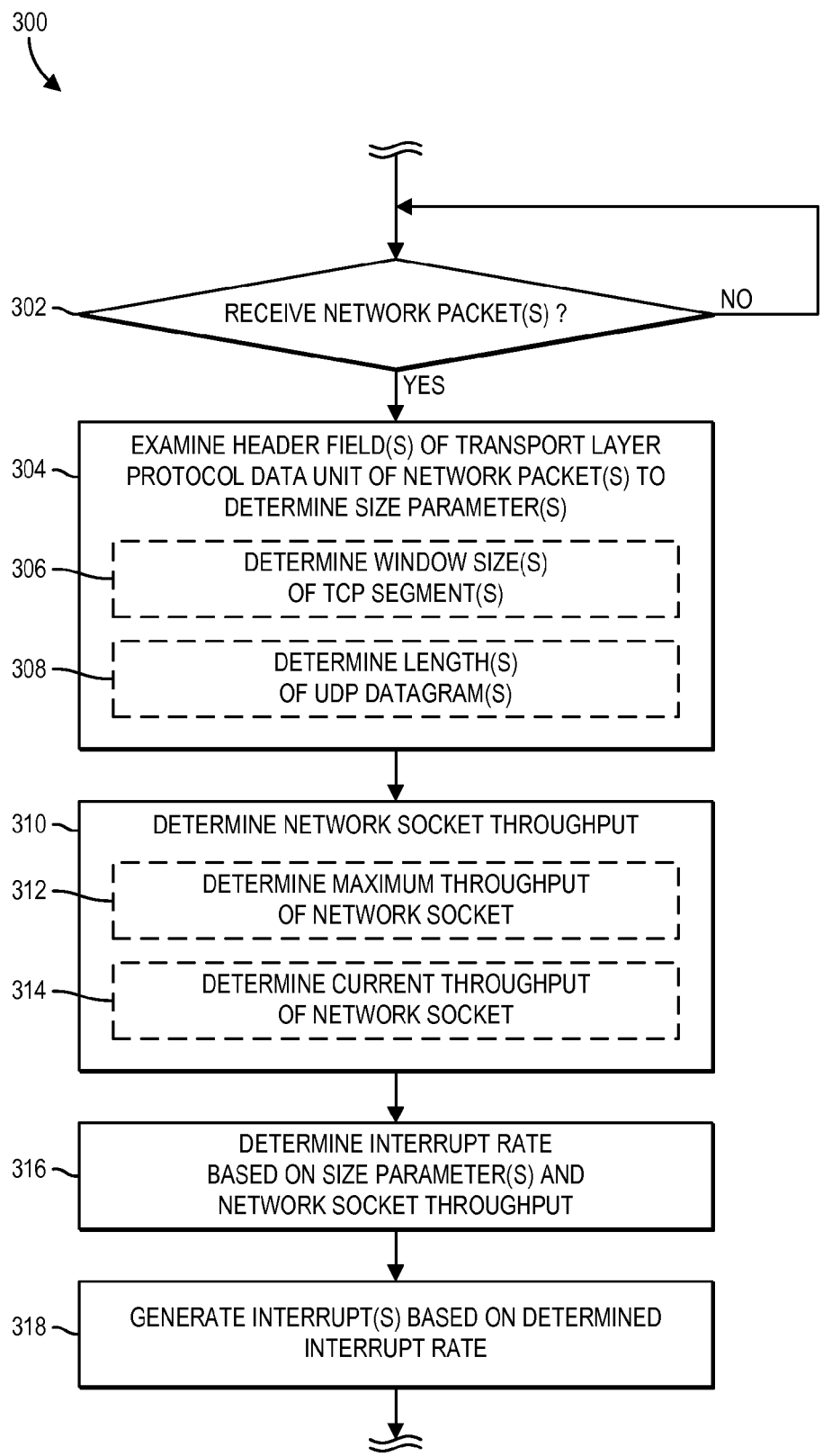
FIG. 3 is a simplified flow diagram of at least one embodiment of a method that may be executed by the computing device of FIG. 1 for moderating generation of packet ingress interrupts for packets received via a network socket.

Referring now to FIG. 3, the local computing device 110 may execute a method 300 for moderating generation of packet ingress interrupts for packets received via a network socket and/or connection. The method 300 begins with decision block 302 in which the local computing device 110 determines whether a network packet is received from the remote computing device 130 via the network(s) 140. If, in decision block 302, the local computing device 110 determines that a network packet is received from the remote computing device 130, the method 300 advances to block 304. If, however, the local computing device 110 determines instead that a network packet has not been received, the method 300 loops back to decision block 302 to continue determining whether a network packet is received from the remote computing device 130.

In block 304, the local computing device 110 examines a header field of the received network packet to determine a size parameter. In the illustrative embodiment, the network packet includes or otherwise encapsulates a transport layer protocol data unit (PDU). The transport layer PDU may be embodied as any type of PDU for enabling network communications between the local computing device 110 and the remote computing device 130 according to the seven-layer Open Systems Interconnection (OSI) model, the four-layer Internet protocol suite (e.g., the TCP/IP model), and/or any other type of communication model or protocol suite. For example, in some embodiments, the transport layer PDU of the received network packet may be embodied as a transmission control protocol (TCP) segment. In other embodiments, the transport layer PDU of the received network packet may be embodied as a user datagram protocol (UDP) datagram. Each type of transport layer PDU (i.e., a TCP segment and a UDP datagram) includes a header field that includes information corresponding to, among others, the source computing device (e.g., the remote computing device 130), the destination computing device (e.g., the local computing device 110), the network socket, the network connection, the integrity of the transmitted PDU, and/or the size of the PDU. For example, in embodiments wherein the transport layer PDU of the received network packet is embodied as a TCP segment, the size parameter may be indicative of a TCP receive window size. In such embodiments, in block 306, the local computing device 110 may examine a TCP header field of the TCP segment to determine the TCP receive window size of the remote computing device 130. In embodiments wherein the transport layer PDU of the received network packet is embodied as a UDP datagram, the size parameter may be indicative of a UDP datagram length. In such embodiments, in block 308, the local computing device 110 may examine a UDP header field of the UDP datagram to determine the datagram length. Regardless, in the illustrative embodiment, the size parameter may be embodied as a value representative of a number of bytes of digital information. It should be appreciated that in other embodiments the size parameter may be represented according to any other type of unit. For example, in some embodiments, the size parameter may be embodied as a value representative of a number of bits or megabytes of digital information. In such embodiments, the local computing device 110 may convert the size parameter to a value representative of the number of bytes of digital information.

In block 310, the local computing device 110 determines a network socket throughput between the local computing device 110 and the remote computing device 130. In some embodiments, the local computing device 110 determines the network socket throughput based on current (e.g., existing, present, active, ongoing, etc.) and/or historical (e.g., previous, inactive, etc.) network communications, network sockets, network connections, and/or network flows between the local computing device 110 and the remote computing device 130. For example, in some embodiments, the local computing device 110 may measure a current network throughput between the local computing device 110 and the remote computing device 130. In another embodiment, the local computing device 110 may calculate the network socket throughput based at least in part on, or otherwise as a function of, information (e.g., timestamps, time to live data, etc.) included in network packets sent/ received by the local computing device 110 to/from the remote computing device 130. Additionally or alternatively, the local computing device 110 may calculate the network socket throughput based at least in part on, or otherwise as a function of, a round-trip delay time measured between the local computing device 110 and the remote computing device 130. In some embodiments, in block 312, the local computing device 110 determines the maximum throughput of a network socket between the local computing device 110 and the remote computing device 130. To do so, the local computing device 110 may determine the maximum throughput previously measured or otherwise calculated between the local computing device 110 and the remote computing device 130. Additionally or alternatively, in block 314, the local computing device 110 may determine the current network socket throughput. Regardless, in the illustrative embodiment, the network socket throughput may be embodied as a value representative of a rate of data, in megabytes per second (MB/s), transmitted over a network socket. It should be appreciated that in other embodiments the network socket throughput may be represented according to any other type of unit. For example, in some embodiments, the network socket throughput may be embodied as a value representative of a data rate, in kilobits per second (kbps) or megabits per second (Mbps), of a network socket and/or connection between the local computing device 110 and the remote computing device 130. In such embodiments, the local computing device 110 may convert the other data rate to a rate measured in megabytes per second (MB/s).

In block 316, the local computing device 110 determines an interrupt rate based on the size parameter and the network socket throughput. To do so, in some embodiments, the local computing device 110 divides the size parameter by the network socket throughput. In the illustrative embodiment, the interrupt rate is embodied as a value indicative of an amount of time, measured in milliseconds (ms), until a packet ingress interrupt should be generated. That is, the interrupt rate is representative of how often a packet ingress interrupt should be generated. It should be appreciated that in other embodiments the interrupt rate may be represented according to any unit of time (e.g., nanoseconds, microseconds, seconds, minutes, etc.). In some embodiments, the local computing device 110 converts the interrupt rate to a suitable unit of time based on the configuration and/or capabilities of one or more components (e.g., the processor 112, a driver, an operating system, and/or any other circuitry, component, or module) of the local computing device 110.

In block 318, the local computing device 110 generates a packet ingress interrupt based on the determined interrupt rate. The packet ingress interrupt is used to notify or otherwise inform other components (e.g., the processor 112, a driver, an operating system, and/or any other circuitry, component, or module) of the local computing device 110 that one or more network packets have been received and are available for further processing. As discussed, the determined interrupt rate may be indicative of a frequency (e.g., how often) and/or an amount of time that should elapse before a packet ingress interrupt is generated. As such, in some embodiments, the local computing device 110 generates a packet ingress interrupt based on determining that an amount of time equal to the determined interrupt rate has passed. For example, in embodiments wherein the local computing device 110 determines an interrupt rate of 10.2 ms, the local computing device 110 may generate a packet ingress interrupt in response to determining that 10.2 ms have elapsed since initialization of the local computing device 110 and/or since the last packet ingress interrupt was generated. In some embodiments, the local computing device 110 determines the passage of time based on one or more timer modules 212 and/or components of the local computing device 110.

Figure 4:
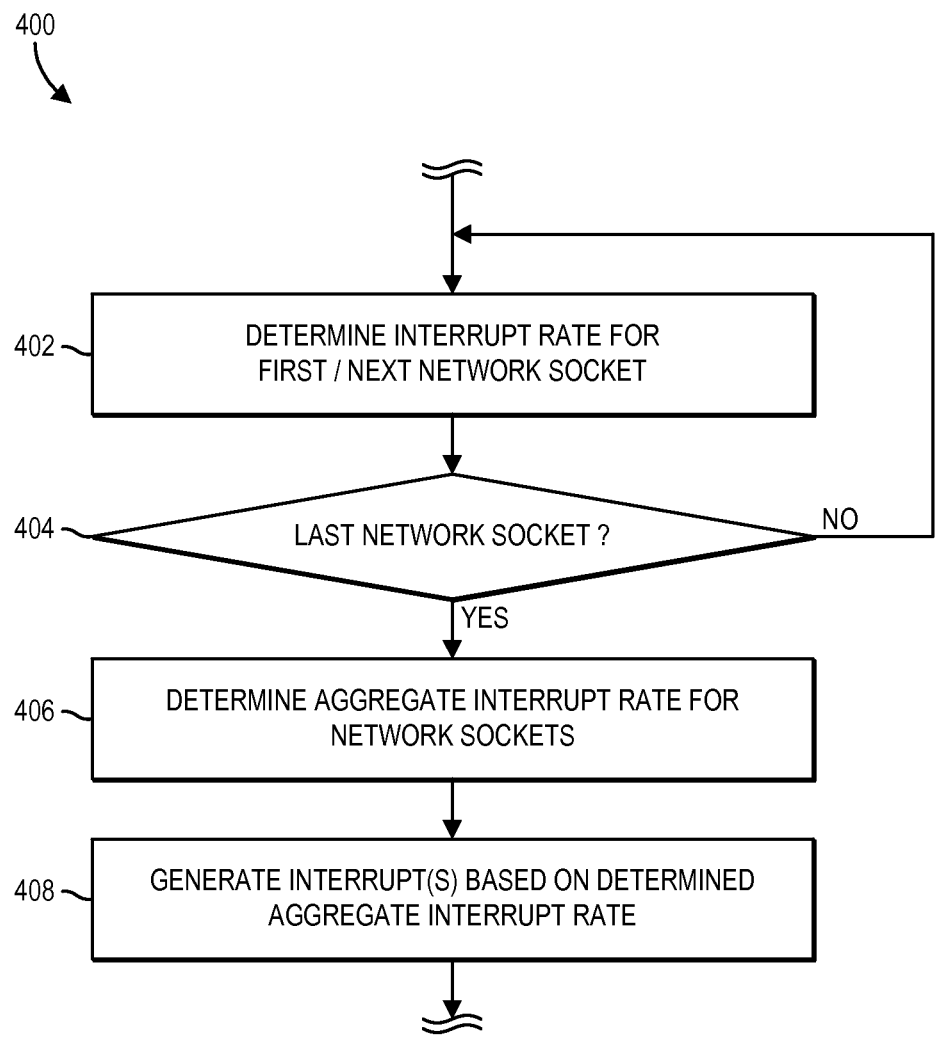
FIG. 4 is a simplified flow diagram of at least one embodiment of a method that may be executed by the computing device of FIG. 1 for moderating generation of packet ingress interrupts for packets received via multiple network sockets.

Referring now to FIG. 4, the local computing device 110 may execute a method 400 for moderating generation of packet ingress interrupts for packets received via multiple network sockets and/or flows. The method 400 begins with block 402 in which the local computing device 110 determines an interrupt rate for the next network socket and/or network flow between the local computing device 110 and the remote computing device(s) 130. To do so, the local computing device 110 may execute all or a portion of a method similar to the method 300 of FIG. 3 discussed above. It should be appreciated that during the first iteration of the method 400, the local computing device 110 determines the interrupt rate for the first network socket and/or flow of the multiple network sockets and/or flows.

In decision block 404, the local computing device 110 determines whether the first/next network socket and/or flow is the last network socket and/or flow. That is, the local computing device 110 determines whether there are any remaining network sockets and/or flows between the local computing device 110 and the remote computing device(s) 130. If, in decision block 404, the local computing device 110 determines that the first/next network socket and/or flow is not the last network socket and/or flow between the local computing device 110 and the remote computing device(s) 130, the method 400 loops back to block 402 to determine the interrupt rate for the next network socket and/or network flow. If, however, the local computing device 110 instead determines in decision block 404 that the first/next network socket and/or flow is the last network socket and/or flow, the method 400 advances to block 406.

In block 406, the local computing device 110 determines an aggregate interrupt rate for the network sockets and/or flows based on the individual interrupt rate determined for each network socket and/or network flow. The aggregate interrupt rate may be embodied as an average, a weighted average, a summation, an aggregation, a combination, and/or any other value derived or obtained from the interrupt rates determined for each of the network sockets and/or flows between the local computing device 110 and the remote computing device(s) 130. For example, in some embodiments, the local computing device 110 may determine the aggregate interrupt rate based on the one or more interrupt rates determined to be the fastest interrupt rates (e.g., shortest duration), which may be preferable for latency sensitive traffic. That is, the local computing device 110 may determine that the individual interrupt rate having the shortest duration should be the aggregate interrupt rate. For instance, if the local computing device 110 determines that three different network sockets have individual interrupt rates of 10 ms, 12 ms, and 58 ms, respectively, the local computing device 110 may determine that that aggregate interrupt rate should be 10 ms. It should be appreciated that using that the individual interrupt rate having the shortest duration as the aggregate interrupt rate may prevent network packets (e.g., frames, cells, etc.) from being dropped and/or prevent the processing resources available to other system components (e.g., the protocol stack, operating system, and application programs) from being reduced.

Additionally or alternatively, the local computing device 110 may average the individual interrupt rate determined for each active TCP socket between the local computing device 110 and the remote computing device(s) 130 to determine the aggregate interrupt rate. To do so, the local computing device 110 may divide the sum of each of the individual interrupt rates by the number of corresponding active TCP sockets. In some embodiments, the local computing device 110 may determine the aggregate interrupt rate based on a rolling or moving average of the individual interrupt rates determined for each active TCP socket. In such embodiments, the local computing device 110 may be configured to average the individual interrupt rates once every second (or according to any other reference frequency or duration). In that way, the aggregate interrupt rate can be adjusted based on newly established TCP sockets. Additionally, utilization of such a rolling average may enable the aggregate interrupt rate to return to a baseline value in response to a period of time in which one or more TCP sockets are idle.

In other embodiments, the local computing device 110 may determine the aggregate interrupt rate based on a weighted average of individual interrupt rates of the network sockets and/or flows. To do so, the local computing device 110 may weight one or more of the individual interrupt rates of the network sockets and/or flows based on, or otherwise as a function of, characteristics of each network socket or flow (e.g., network socket or flow utilization, available throughput, etc.), operational parameters of the local computing device 110 (e.g., resource levels, device status, etc.), and/or a type or a characteristic of the network traffic (e.g., latency sensitive traffic, bulk data transmissions, gaming traffic, file transfers, streaming video, streaming audio, remote backups, VoIP, financial services industry transactions, etc.). For example, in some embodiments, the local computing device 110 may more heavily weight the one or more interrupt rates determined to be the fastest interrupt rates (e.g., shortest duration), which as discussed, may be preferable for latency sensitive traffic. Additionally or alternatively, the local computing device 110 may more heavily weight the one or more interrupt rates determined to be the slowest interrupt rates (e.g., longest duration), which may be preferable for bulk file transfers, streaming video, and the like. In another example, the local computing device 110 may more favorably weight the interrupt rates corresponding to the most heavily used network sockets and/or flows. Such network sockets and flows may have the greatest impact on resources (e.g., processor utilization, memory capacity, etc.) of the local computing device 110. In such examples, the local computing device 110 may be configured to determine the product of each individual interrupt rate and an amount of data (e.g., bits, bytes, etc.) transmitted on the corresponding network sockets and/or flow. The local computing device 110 may then divide the sum of those determined products by the product of the total amount of data (e.g., bits, bytes, etc.) transmitted over all network sockets/flows and the throughput of the network sockets/flows.

In block 408, the local computing device 110 generates one or more packet ingress interrupts based at least in part on, or otherwise as a function of, the aggregate interrupt rate. The packet ingress interrupts are used to notify or otherwise inform other components (e.g., the processor 112, a driver, an operating system, and/or any other circuitry, component, or module) of the local computing device 110 that one or more network packets have been received and are available for further processing. As discussed, the determined aggregate interrupt rate may be indicative of a frequency (e.g., how often) and/or an amount of time that should elapse before a packet ingress interrupt is generated. As such, in some embodiments, the local computing device 110 generates a packet ingress interrupt based on determining that an amount of time equal to the determined aggregate interrupt rate has passed. In some embodiments, the local computing device 110 determines the passage of time based on one or more timer modules 212 and/or components of the local computing device 110.

Figure 5:
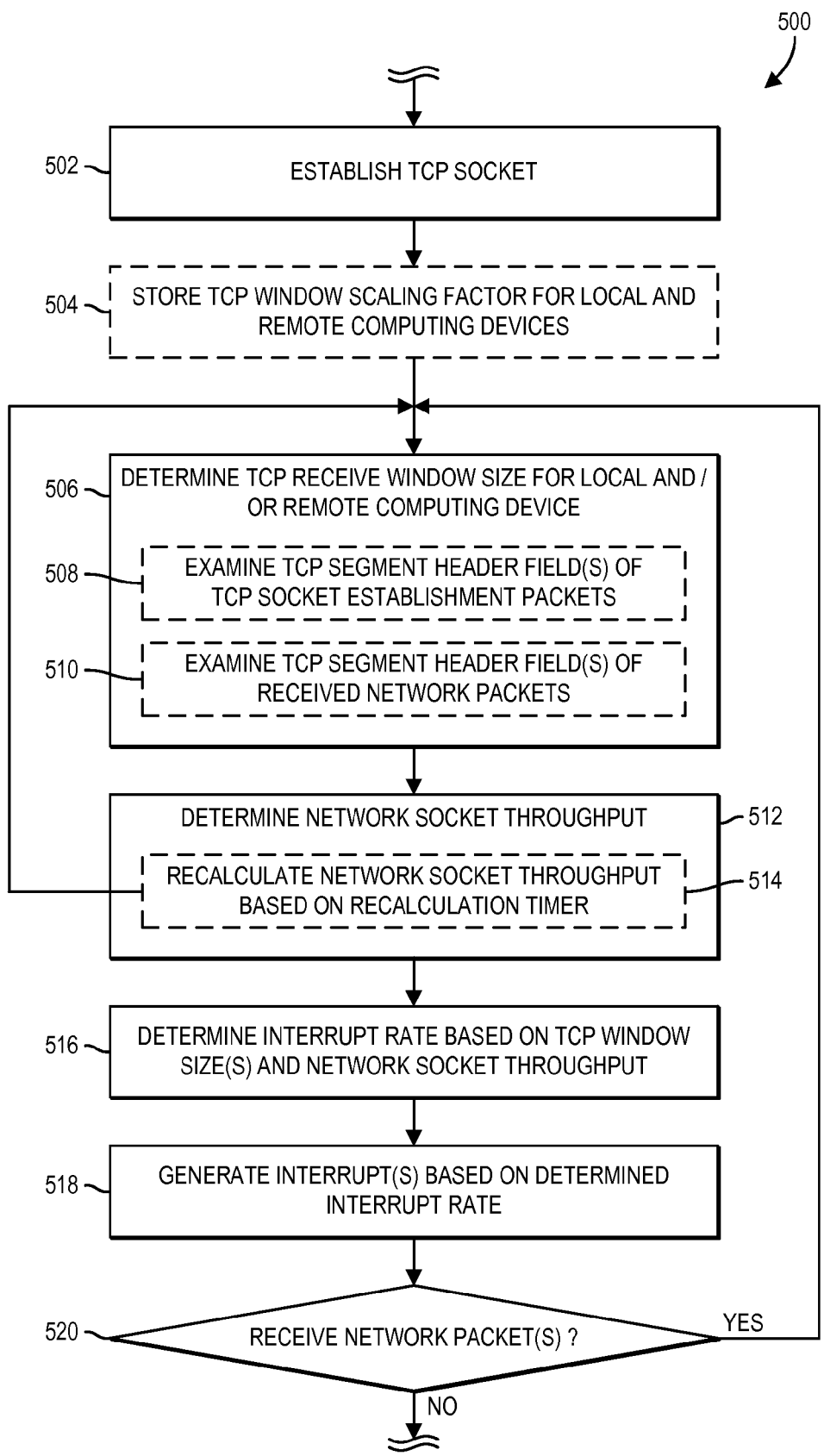
FIG. 5 is a simplified flow diagram of at least one embodiment of a method that may be executed by the computing device of FIG. 1 for moderating generation of packet ingress interrupts for packets received via a transport control protocol network socket.

Referring now to FIG. 5, the local computing device 110 may execute a method 500 for moderating generation of packet ingress interrupts for packets received via a transport control protocol (TCP) network socket. The method 500 begins with block 502 in which the local computing device 110 establishes a TCP socket and/or connection with the remote computing device 130. To do so, in some embodiments, the local computing device 110 participates in a three-way handshake process with the remote computing device 130. For example, in some embodiments, the local computing device 110 transmits a synchronize ("SYN") message to the remote computing device 130. In response to the SYN message, the local computing device 110 receives a synchronize-acknowledgement ("SYN-ACK") message from the remote computing device 130. Subsequently, the local computing device 110 transmits an acknowledgement ("ACK") message to the remote computing device 130 in response to receipt of the SYN-ACK message. It should be appreciated that the SYN, SYN-ACK, and ACK messages may be embodied as, or otherwise included in, separate network packets transmitted to and/or received from the remote computing device 130. For example, in some embodiments, the local computing device 110 and the remote computing device 130 may exchange network packets to establish the TCP socket. In such embodiments, a SYN flag, an ACK flag, or a combination of the SYN and ACK flags may be set in the TCP header fields for each network packet to indicate whether a particular network packet is a SYN message, a SYN-ACK message, or an ACK message.

In some embodiments, in block 504, the local computing device 110 may store a TCP window scaling factor corresponding to each of the local computing device 110 and the remote computing device 130. To do so, the local computing device 110 may examine the TCP header fields of TCP segments included in the network packets transmitted to and/or received from the remote computing device 130 to determine the TCP window scaling factors. In some embodiments, the TCP segments of the network packets transmitted to and/or received from the remote computing device 130 may be the TCP segments of the network packets transmitted to and/or received from the remote computing device 130 during establishment of the TCP socket (e.g., block 502). Additionally or alternatively, the TCP segments of the network packets transmitted to and/or received from the remote computing device 130 may be TCP segments of network packets transmitted to and/or received from the remote computing device 130 after the TCP socket has been established. It should be appreciated that the local computing device 110 use any other process or technology to determine the TCP window scaling factor of the local computing device 110 and/or the remote computing device 130. For example, in some embodiments, the local computing device 110 may examine a portion of a network protocol stack (e.g., a TCP portion, module, or layer) of an operating system to determine the TCP window scaling factor of the local computing device 110. In that way, the local computing device 110 may determine its own TCP window scaling factor without having to examine TCP segments of network packets being transmitted to the remote computing device 130. As discussed in more detail below, the TCP window scaling factors may be used to increase the receive window size of the remote computing device 130 and the window size of the local computing device 110.

In block 506, the local computing device 110, determines the TCP receive window size for the remote computing device 130 and/or the local computing device 110. To do so, the local computing device 110 examines a header field (e.g., a window size header field) of a TCP segment of a network packet received from the remote computing device 130 and/or a header field (e.g., a window size header field) of a TCP segment of a network packet transmitted to the remote computing device 130. The window size header fields of the TCP segments may be indicative of an amount of data, in bytes, that the remote computing device 130 and the local computing device 110 are willing to receive from each other. That is, the TCP receive window size of the local computing device 110 is indicative of the amount of data that the local computing device 110 is willing to receive from the remote computing device 130. Similarly, the TCP receive window size of the remote computing device 130 is indicative of the amount of data that the remote computing device 130 is willing to receive from the local computing device 110. It should be appreciated that the TCP receive window size corresponding to the local computing device 110 and/or the remote computing device 130 may be measured in units other than bytes. For example, in some embodiments, the receive window sizes may be indicative of the number of bits or megabytes of data (e.g., digital information) that local computing device 110 and/or the remote computing device 130 is willing to receive via a network socket and/or flow. In embodiments wherein the receive window sizes are indicative of the number of bits or megabytes of data that local computing device 110 and/or the remote computing device 130 is willing to receive instead of the number of bytes of data, the local computing device 110 may convert the window sizes to a corresponding number of bytes of data.

As discussed, in some embodiments, the local computing device 110 may store a TCP window scaling factor corresponding to the local computing device 110 and/or the remote computing device 130. In such embodiments, the local computing device 110 may increase the receive window size of the local computing device 110 and/or the remote computing device 130 based on the corresponding TCP window scaling factor. As a result, the receive window sizes determined by the local computing device 110 may be indicative of the receive window sizes determined from the TCP segments of the network packets transmitted to and/or received from the remote computing device 130 and the TCP window scaling factors obtained during establishment of the TCP socket.

In some embodiments, in block 508, the local computing device 110 determines the TCP receive window size for the remote computing device 130 and/or the local computing device 110 based on, or otherwise as a function of, the TCP segments of network packets transmitted to and/or received from the remote computing device 130 during establishment of the TCP socket (e.g., block 502). In such embodiments, the local computing device 110 examines the header fields (e.g., the receive window header fields) of the TCP segments of the network packets transmitted to and/or received from the remote computing device 130 during socket and/or connection establishment. Additionally or alternatively, in block 510, the local computing device 110 determines the TCP receive window size for the remote computing device 130 and/or the local computing device 110 based on, or otherwise as a function of, the TCP segments of the network packets transmitted to and/or received from the remote computing device 130 after establishment of the TCP socket (e.g., block 502). It should be appreciated that the local computing device 110 use any other process or technology to determine the TCP receive window size of the local computing device 110 and/or the remote computing device 130. For example, in some embodiments, the local computing device 110 may examine a portion of a network protocol stack (e.g., a TCP portion, module, or layer) of an operating system to determine the TCP receive window size of the local computing device 110. In that way, the local computing device 110 may determine its own TCP receive window size without having to examine TCP segments of network packets being transmitted to the remote computing device 130.

In block 512, the local computing device 110 determines a network socket throughput between the local computing device 110 and the remote computing device 130. In some embodiments, the local computing device 110 determines the network socket throughput based on current (e.g., existing, present, active, ongoing, etc.) and/or historical (e.g., previous, inactive, etc.) network communications, network sockets, network connections, and/or network flows between the local computing device 110 and the remote computing device 130. As such, in some embodiments, the network socket throughput may be embodied as a current network socket throughput between the local computing device 110 and the remote computing device 130. Additionally or alternatively, the network socket throughput may be embodied as a maximum throughput previously measured or otherwise calculated between the local computing device 110 and the remote computing device 130. In either case, the network socket throughput may be representative of a data rate, in megabytes per second (MB/s), of a network socket and/or flow between the local computing device 110 and the remote computing device 130. It should be appreciated that in other embodiments the network socket throughput may be represented according to any other type of data rate unit such as, for example, kilobits per second (kbps) or megabits per second (Mbps). In embodiments wherein the network socket throughput is represented according to a data rate unit other than megabytes per second (MB/s), the local computing device 110 may convert the network socket throughput to a corresponding data rate unit in megabytes per second (MB/s). After determining the network socket throughput, the method 500 advances to block 516.

In some embodiments, in block 514, the local computing device 110 may also recalculate the network socket throughput based on a recalculation timer. For example, in some embodiments, the local computing device 110 recalculates the network socket throughput of a network socket and/or connection between the local computing device 110 and the remote computing device 130 once every second based on a reference recalculation timer. The reference recalculation timer may be preconfigured with a duration of time, which upon expiration of the preconfigured duration of time, causes the local computing device 110 to recalculate the network socket throughput. In some embodiments, expiration of the reference recalculation timer may also cause the local computing device 110 to determine a new receive window size of the local computing device 110 and/or the remote computing device 130 based on TCP segments of new network packets transmitted to and/or received from the remote computing device 130. In such embodiments, the method 500 may loop back to block 506 to determine the receive window sizes of the local computing device 110 and/or the remote computing device 130 based on the newly received network packets. It should be appreciated that, in some embodiments, the method 500 may continue executing block 516 for the previously received and/or transmitted network packets while looping back to block 506 to determine the receive window sizes for the newly received network packets.

In block 516, the local computing device 110 determines an interrupt rate based on the determined received window sizes and the determined network socket throughput. To do so, in some embodiments, the local computing device 110 determines a minimum receive window size based on determining the lesser of the receive window size of the remote computing device 130 and the receive window size of the local computing device 110. In such embodiments, the local computing device 110 divides the minimum receive window size by the network socket throughput to determine the interrupt rate. In other embodiments, to determine the interrupt rate, the local computing device 110 divides the minimum receive window size by the greater of the current network socket throughput and the maximum throughput previously measured or otherwise calculated between the local computing device 110 and the remote computing device 130.

In block 518, the local computing device 110 generates a packet ingress interrupt based on the determined interrupt rate. The packet ingress interrupt is used to notify or otherwise inform other components (e.g., the processor 112, a driver, an operating system, and/or any other circuitry, component, or module) of the local computing device 110 that one or more network packets have been received and are available for further processing. As discussed, the determined interrupt rate may be indicative of a frequency (e.g., how often) and/or an amount of time that should elapse before a packet ingress interrupt is generated. As such, in some embodiments, the local computing device 110 generates a packet ingress interrupt based on determining that an amount of time equal to the determined interrupt rate has passed. In some embodiments, the local computing device 110 determines the passage of time based on one or more timer modules 212 and/or components of the local computing device 110.

In decision block 520, the local computing device 110 determines whether a new network packet has been received from the remote computing device 130. If, in decision block 520, the local computing device 110 determines that a new network packet is received from the remote computing device 130, the method 500 loops back to block 506 and the local computing device 110 determines the TCP receive window size(s) of the local computing device 110 and/or the remote computing device 130 based on the newly received network packet. In that way, the local computing device 110 may update and/or generate a new interrupt rate based on changes to the characteristics of each network socket or flow (e.g., network socket or flow utilization, available throughput, etc.), the operational parameters of the local computing device 110 (e.g., resource levels, device status, etc.), and/or the type or the characteristics of the network traffic (e.g., latency sensitive traffic, bulk data transmissions, gaming traffic, file transfers, streaming video, streaming audio, remote backups, VoIP, financial services industry transactions, etc.).

Figure 6:
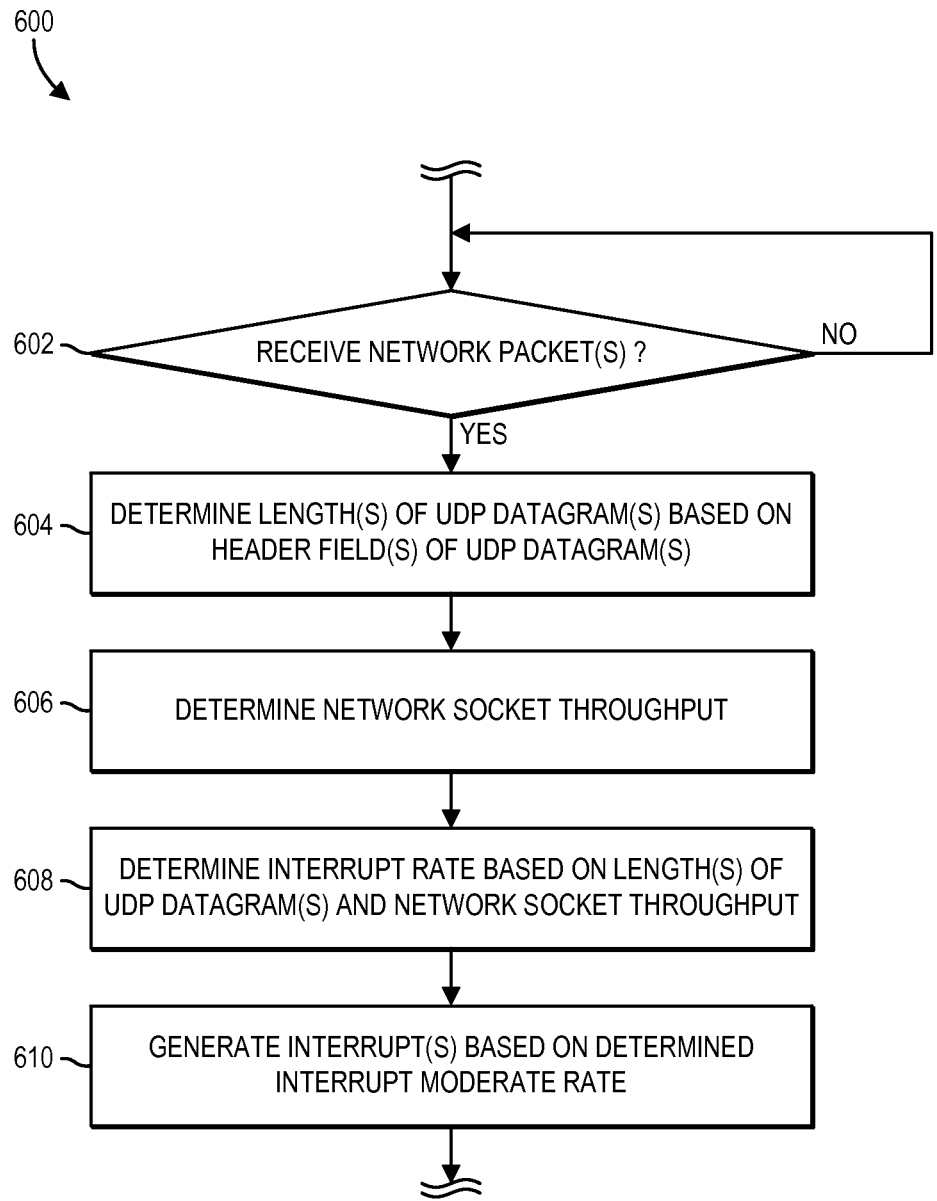
FIG. 6 is a simplified flow diagram of at least one embodiment of a method that may be executed by the computing device of FIG. 1 for moderating generation of packet ingress interrupts for packets received via a user datagram protocol network socket.

Referring now to FIG. 6, the local computing device 110 may execute a method 600 for moderating generation of packet ingress interrupts for packets received via a user datagram protocol (UDP) network socket and/or flow. The method 600 begins with decision block 602 in which the local computing device 110 determines whether one or more network packets including a UDP datagram is received from the remote computing device 130 via the network 140. If, in decision block 602, the local computing device 110 determines that a network packet including a UDP datagram is received from the remote computing device 130, the method 600 advances to block 604. If, however, the local computing device 110 determines instead that a network packet including a UDP datagram has not been received, the method 600 loops back to decision block 602 to continue determining whether a network packet including a UDP datagram is received from the remote computing device 130.

In block 604, the local computing device 110 determines the length of the UDP datagram of the network packet received from the remote computing device 130. To do so, the local computing device 110 examines a header field (e.g., a datagram length header field) of the UDP datagram of the network packet received from the remote computing device 130. The datagram length header field of the UDP datagram may be indicative of the length, in bytes, of the UDP datagram (e.g., the length of the header and the payload of the UDP datagram). It should be appreciated that the datagram length corresponding to the UDP datagram of the network packet received from the remote computing device 130 may be measured in units other than bytes. For example, in some embodiments, the datagram length may be represented as a number of bits or megabytes of data (e.g., digital information). In embodiments wherein the datagram length is represented as a number of bits or megabytes of data, the local computing device 110 may convert the datagram length to a corresponding number of bytes of data.

In block 606, the local computing device 110 determines a network socket throughput between the local computing device 110 and the remote computing device 130. In some embodiments, the local computing device 110 determines the network socket throughput based on current (e.g., existing, present, active, ongoing, etc.) and/or historical (e.g., previous, inactive, etc.) network communications, network sockets, network connections, and/or network flows between the local computing device 110 and the remote computing device 130. As such, in some embodiments, the network socket throughput may be embodied as a current network socket throughput between the local computing device 110 and the remote computing device 130. Additionally or alternatively, the network socket throughput may be embodied as a maximum throughput previously measured or otherwise calculated between the local computing device 110 and the remote computing device 130. In either case, the network socket throughput may be representative of a data rate, in megabytes per second (MB/s), of a network socket and/or network flow between the local computing device 110 and the remote computing device 130. It should be appreciated that in other embodiments the network socket throughput may be represented according to any other type of data rate unit such as, for example, kilobits per second (kbps) or megabits per second (Mbps). In embodiments wherein the network socket throughput is represented according to a data rate unit other than megabytes per second (MB/s), the local computing device 110 may convert the network socket throughput to a corresponding data rate unit in megabytes per second (MB/s).

In block 608, the local computing device 110 determines an interrupt rate based on the determined datagram length and the determined network socket throughput. To do so, in some embodiments, the local computing device 110 divides the determined datagram length by the network socket throughput. In other embodiments, to determine the interrupt rate, the local computing device 110 divides the datagram length by the greater of the current network socket throughput and the maximum socket previously measured or otherwise calculated between the local computing device 110 and the remote computing device 130.

In block 610, the local computing device 110 generates a packet ingress interrupt based on the determined interrupt rate. The packet ingress interrupt is used to notify or otherwise inform other components (e.g., the processor 112, a driver, an operating system, and/or any other circuitry, component, or module) of the local computing device 110 that one or more network packets have been received and are available for processing. As discussed, the determined interrupt rate may be indicative of a frequency (e.g., how often) and/or an amount of time that should elapse before a packet ingress interrupt is generated. As such, in some embodiments, the local computing device 110 generates a packet ingress interrupt based on determining that an amount of time equal to the determined interrupt rate has passed. In some embodiments, the local computing device 110 determines the passage of time based on one or more timer modules 212 and/or components of the local computing device 110.

EXAMPLES

Illustrative examples of the technologies disclosed herein are provided below. An embodiment of the technologies may include any one or more, and any combination of, the examples described below.

Example 1 includes a local computing device to generate an interrupt for process of incoming network packets, the local computing device comprising a communication module to receive a network packet from a remote computing device; an interrupt rate determination module to (i) examine a header field of a transport layer protocol data unit of the received network packet to determine a size parameter, (ii) determine a network socket throughput between the local computing device and the remote computing device based on communications between the local computing device and the remote computing device, and (iii) determine an interrupt rate based on the determined size parameter and the network socket throughput; and an interrupt generation module to generate an interrupt based on the determined interrupt rate to allow processing of the network packet.

Example 2 includes the subject matter of Example 1, and wherein to examine the header field comprises to examine a transmission control protocol header of a transmission control protocol segment to determine a receive window size of the remote computing device; and wherein to determine the interrupt rate comprises to determine the interrupt rate based on the determined receive window size of the remote computing device and the network socket throughput.

Example 3 includes the subject matter of any of Examples 1 and 2, and wherein the communication module is further to transmit a separate network packet to the remote computing device; wherein the interrupt rate determination module is further to (i) examine a transmission control protocol header of a transmission control protocol segment of the transmitted network packet to determine a receive window size of the local computing device and (ii) determine a minimum receive window size based on a determination of a lesser of the receive window size of the remote computing device and the receive window size of the local computing device; and wherein to determine the interrupt rate comprises to determine the interrupt rate based on the determined minimum receive window size divided by the network socket throughput.

Example 4 includes the subject matter of any of Examples 1-3, and wherein the interrupt rate determination module is further to (i) store a window scale factor for each of the local and remote computing devices and (ii) increase the receive window size of the remote computing device and the window size of the local computing device as a function of the window scale factor of each of the local and remote computing devices.

Example 5 includes the subject matter of any of Examples 1-4, and wherein the communication module is further to establish a transmission control protocol socket between the local computing device and the remote computing device; and wherein the network packet received from the remote computing device and the separate network packet transmitted to the remote computing device are transmitted to and received from the remote computing device as a function of the establishment of the transmission control protocol socket between the local computing device and the remote computing device.

Example 6 includes the subject matter of any of Examples 1-5, and wherein to examine the header field comprises to examine a user datagram protocol segment header of a user datagram protocol segment to determine a datagram length of the user datagram protocol segment; and wherein to determine the interrupt rate comprises to determine the interrupt rate based on the determined datagram length of the user datagram protocol segment and the network socket throughput.

Example 7 includes the subject matter of any of Examples 1-6, and wherein the interrupt rate determination module is further to (i) determine a maximum throughput of the network socket based on historical communications between the local computing device and the remote computing device and (ii) determine a current throughput of the network socket based on current communications between the local computing device and the remote computing device; and wherein to determine the network socket throughput comprises to determine the network socket throughput based on a determination of a greater of the maximum throughput and the current throughput of the network socket.

Example 8 includes the subject matter of any of Examples 1-7, and wherein to receive the network packet comprises to receive a first network packet from the remote computing device via a first network socket; wherein to examine the header field of the transport layer protocol data unit of the received network packet comprises to examine the header field of the transport layer protocol data unit of the received first network packet to determine a first size parameter; wherein to determine the network socket throughput comprises to determine a first network socket throughput for the first network socket; wherein to determine the interrupt rate comprises to determine a first interrupt rate for the first network socket based on the determined first size parameter and the first network socket throughput; wherein the communication module is further to receive a second network packet from the remote computing device via a second network socket; wherein the interrupt rate determination module is further to (i) examine a header field of a transport layer protocol data unit of the received second network packet to determine a second size parameter, (ii) determine a second network socket throughput for the second network socket, (iii) determine a second interrupt rate for the second network socket based on the determined second size parameter and the second network socket throughput, and (iv) determine an aggregate interrupt rate for the first and second network sockets based on the determined first and second interrupt rates; and wherein to generate the interrupt comprises to generate the interrupt based on the determined aggregate interrupt rate for the first and second network sockets to allow processing of the first and second network packets.

Example 9 includes the subject matter of any of Examples 1-8, and wherein to determine the aggregate interrupt rate comprises to determine the aggregate interrupt rate based on a determination of a lesser of the first interrupt rate and the second interrupt rate.

Example 10 includes the subject matter of any of Examples 1-9, and wherein to determine the aggregate interrupt rate comprises to determine the aggregate interrupt based on an average of the determined first and second interrupt rates.

Example 11 includes the subject matter of any of Examples 1-10, and wherein the interrupt rate determination module is further to weight at least one of the first or second interrupt rates based on a socket type of the first or second network sockets.

Example 12 includes a local computing device to generate an interrupt for process of incoming network packets, the local computing device comprising means for receiving a network packet from a remote computing device; means for examining a header field of a transport layer protocol data unit of the received network packet to determine a size parameter; means for determining a network socket throughput between the local computing device and the remote computing device based on communications between the local computing device and the remote computing device; means for determining an interrupt rate based on the determined size parameter and the network socket throughput; and means for generating an interrupt based on the determined interrupt rate to allow processing of the network packet.

Example 13 includes the subject matter of Example 12, and wherein the means for examining the header field comprises means for examining a transmission control protocol header of a transmission control protocol segment to determine a receive window size of the remote computing device; and Wherein the means for determining the interrupt rate comprises means for determining the interrupt rate based on the determined receive window size of the remote computing device and the network socket throughput.

Example 14 includes the subject matter of any of Examples 12 and 13, and further including means for transmitting a separate network packet to the remote computing device; means for examining a transmission control protocol header of a transmission control protocol segment of the transmitted network packet to determine a receive window size of the local computing device; means for determining a minimum receive window size based on a determination of a lesser of the receive window size of the remote computing device and the receive window size of the local computing device; and wherein the means for determining the interrupt rate comprises means for determining the interrupt rate based on the determined minimum receive window size divided by the network socket throughput.

Example 15 includes the subject matter of any of Examples 12-14, and further including means for storing a window scale factor for each of the local and remote computing devices; and means for increasing the receive window size of the remote computing device and the window size of the local computing device as a function of the window scale factor of each of the local and remote computing devices.

Example 16 includes the subject matter of any of Examples 12-15, and further including means for establishing a transmission control protocol socket between the local computing device and the remote computing device; and wherein the means for receiving the network packet from the remote computing device and the means for transmitting the separate network packet to the remote computing device comprise means for receiving the network packet from the remote computing device and transmitting the separate network packet to the remote computing device as a function of establishing the transmission control protocol socket between the local computing device and the remote computing device.

Example 17 includes the subject matter of any of Examples 12-16, and wherein the means for examining the header field comprises means for examining a user datagram protocol segment header of a user datagram protocol segment to determine a datagram length of the user datagram protocol segment; and wherein the means for determining the interrupt rate comprises means for determining the interrupt rate based on the determined datagram length of the user datagram protocol segment and the network socket throughput.

Example 18 includes the subject matter of any of Examples 12-17, and further including means for determining a maximum throughput of the network socket based on historical communications between the local computing device and the remote computing device; means for determining a current throughput of the network socket based on current communications between the local computing device and the remote computing device; and wherein the means for determining the network socket throughput comprises means for determining the network socket throughput based on a determination of a greater of the maximum throughput and the current throughput of the network socket.

Example 19 includes the subject matter of any of Examples 12-18, and wherein the means for receiving the network packet comprises means for receiving a first network packet from the remote computing device via a first network socket; wherein the means for examining the header field of the transport layer protocol data unit of the received network packet comprises means for examining the header field of the transport layer protocol data unit of the received first network packet to determine a first size parameter; wherein the means for determining the network socket throughput comprises means for determining a first network socket throughput for the first network socket; wherein the means for determining the interrupt rate comprises means for determining a first interrupt rate for the first network socket based on the determined first size parameter and the first network socket throughput; and further comprising means for receiving a second network packet from the remote computing device via a second network socket; means for examining a header field of a transport layer protocol data unit of the received second network packet to determine a second size parameter; means for determining a second network socket throughput for the second network socket; means for determining a second interrupt rate for the second network socket based on the determined second size parameter and the second network socket throughput; means for determining an aggregate interrupt rate for the first and second network sockets based on the determined first and second interrupt rates; and wherein the means for generating the interrupt comprises means for generating the interrupt based on the determined aggregate interrupt rate for the first and second network sockets to allow processing of the first and second network packets.

Example 20 includes the subject matter of any of Examples 12-19, and wherein the means for determining the aggregate interrupt rate comprises means for determining the aggregate interrupt rate based on a determination of a lesser of the first interrupt rate and the second interrupt rate.

Example 21 includes the subject matter of any of Examples 12-20, and wherein the means for determining the aggregate interrupt rate comprises means for determining the aggregate interrupt based on an average of the determined first and second interrupt rates.

Example 22 includes the subject matter of any of Examples 12-21, and further including means for weighting at least one of the first or second interrupt rates based on a socket type of the first or second network sockets.

Example 23 includes a method for generating an interrupt for processing incoming network packets, the method comprising receiving, by a local computing device, a network packet from a remote computing device; examining, by the local computing device, a header field of a transport layer protocol data unit of the received network packet to determine a size parameter; determining, by the local computing device, a network socket throughput between the local computing device and the remote computing device based on communications between the local computing device and the remote computing device; determining, by the local computing device, an interrupt rate based on the determined size parameter and the network socket throughput; and generating, by the local computing device, an interrupt based on the determined interrupt rate to allow processing of the network packet.

Example 24 includes the subject matter of Example 23, and wherein examining the header field comprises examining a transmission control protocol header of a transmission control protocol segment to determine a receive window size of the remote computing device; and wherein determining the interrupt rate comprises determining the interrupt rate based on the determined receive window size of the remote computing device and the network socket throughput.

Example 25 includes the subject matter of any of Examples 23 and 24, and further including transmitting, by the local computing device, a separate network packet to the remote computing device; examining, by the local computing device, a transmission control protocol header of a transmission control protocol segment of the transmitted network packet to determine a receive window size of the local computing device; determining a minimum receive window size based on a determination of a lesser of the receive window size of the remote computing device and the receive window size of the local computing device; and wherein determining the interrupt rate comprises determining the interrupt rate based on the determined minimum receive window size divided by the network socket throughput.

Example 26 includes the subject matter of any of Examples 23-25, and further including storing, by the local computing device, a window scale factor for each of the local and remote computing devices; and increasing, by the local computing device, the receive window size of the remote computing device and the window size of the local computing device as a function of the window scale factor of each of the local and remote computing devices.

Example 27 includes the subject matter of any of Examples 23-26, and further including establishing, by the local computing device, a transmission control protocol socket between the local computing device and the remote computing device; and wherein receiving the network packet from the remote computing device and transmitting the separate network packet to the remote computing device comprise receiving the network packet from the remote computing device and transmitting the separate network packet to the remote computing device as a function of establishing the transmission control protocol socket between the local computing device and the remote computing device.

Example 28 includes the subject matter of any of Examples 23-27, and wherein examining the header field comprises examining a user datagram protocol segment header of a user datagram protocol segment to determine a datagram length of the user datagram protocol segment; and wherein determining the interrupt rate comprises determining the interrupt rate based on the determined datagram length of the user datagram protocol segment and the network socket throughput.

Example 29 includes the subject matter of any of Examples 23-28, and further including determining, by the local computing device, a maximum throughput of the network socket based on historical communications between the local computing device and the remote computing device; determining, by the local computing device, a current throughput of the network socket based on current communications between the local computing device and the remote computing device; and wherein determining the network socket throughput comprises determining the network socket throughput based on a determination of a greater of the maximum throughput and the current throughput of the network socket.

Example 30 includes the subject matter of any of Examples 23-29, and wherein receiving the network packet comprises receiving a first network packet from the remote computing device via a first network socket; wherein examining the header field of the transport layer protocol data unit of the received network packet comprises examining the header field of the transport layer protocol data unit of the received first network packet to determine a first size parameter; wherein determining the network socket throughput comprises determining a first network socket throughput for the first network socket; wherein determining the interrupt rate comprises determining a first interrupt rate for the first network socket based on the determined first size parameter and the first network socket throughput; and further comprising receiving, by the local computing device, a second network packet from the remote computing device via a second network socket; examining, by the local computing device, a header field of a transport layer protocol data unit of the received second network packet to determine a second size parameter; determining, by the local computing device, a second network socket throughput for the second network socket; determining, by the local computing device, a second interrupt rate for the second network socket based on the determined second size parameter and the second network socket throughput; determining, by the local computing device, an aggregate interrupt rate for the first and second network sockets based on the determined first and second interrupt rates; and wherein generating the interrupt comprises generating the interrupt based on the determined aggregate interrupt rate for the first and second network sockets to allow processing of the first and second network packets.

Example 31 includes the subject matter of any of Examples 23-30, and wherein determining the aggregate interrupt rate comprises determining the aggregate interrupt rate based on a determination of a lesser of the first interrupt rate and the second interrupt rate.

Example 32 includes the subject matter of any of Examples 23-31, and wherein determining the aggregate interrupt rate comprises determining the aggregate interrupt based on an average of the determined first and second interrupt rates.

Example 33 includes the subject matter of any of Examples 23-32, and further including weighting, by the local computing device, at least one of the first or second interrupt rates based on a socket type of the first or second network sockets.

Example 34 includes a local computing device to generate an interrupt for process of incoming network packets, the local computing device comprising a processor; and a memory having stored therein a plurality of instructions that when executed by the processor cause the local computing device to perform the method of any of Examples 23-33.

Example 35 includes one or more machine-readable media comprising a plurality of instructions stored thereon that in response to being executed result in a local computing device performing the method of any of Examples 23-33.

The invention claimed is:

1. A local computing device to generate an interrupt for processing of incoming network packets, the local computing device comprising:
a communication module to receive a network packet from a remote computing device and transmit a separate network packet to the remote computing device;
an interrupt rate determination module to (i) examine a transmission control protocol header of a transmission control protocol segment of the received network packet to determine a receive window size of the remote computing device, (ii) examine a transmission control protocol header of a transmission control protocol segment of the transmitted network packet to determine a receive window size of the local computing device, (iii) determine a lesser of the receive window size of the remote computing device and the receive window size of the local computing device, (iv) determine a network socket throughput between the local computing device and the remote computing device based on communications between the local computing device and the remote computing device, and (v) divide the determined lesser receive window size by the determined network socket throughput to determine an interrupt rate; and
an interrupt generation module to generate an interrupt based on the determined interrupt rate to allow processing of the network packet.

2. The local computing device of claim 1, wherein the interrupt rate determination module is further to (i) store a window scale factor for each of the local and remote computing devices and (ii) increase the receive window size of the remote computing device and the window size of the local computing device as a function of the window scale factor of each of the local and remote computing devices.

3. The local computing device of claim 2, wherein the communication module is further to establish a transmission control protocol socket between the local computing device and the remote computing device; and
wherein the network packet received from the remote computing device and the separate network packet transmitted to the remote computing device are transmitted to and received from the remote computing device as a function of the establishment of the transmission control protocol socket between the local computing device and the remote computing device.

4. The local computing device of claim 1, wherein the interrupt rate determination module is further to examine a user datagram protocol segment header of a user datagram protocol segment to determine a datagram length of the user datagram protocol segment; and
determine a separate interrupt rate based on the determined datagram length of the user datagram protocol segment and a separate network socket throughput.

5. The local computing device of claim 1, wherein the interrupt rate determination module is further to (i) determine a maximum throughput of the network socket based on historical communications between the local computing device and the remote computing device and (ii) determine a current throughput of the network socket based on current communications between the local computing device and the remote computing device; and
wherein to determine the network socket throughput comprises to determine the network socket throughput based on a determination of a greater of the maximum throughput and the current throughput of the network socket.

6. The local computing device of claim 1, wherein to receive the network packet comprises to receive a first network packet from the remote computing device via a first network socket;
wherein to determine the receive window size comprises to determine a first size parameter;
wherein to determine the network socket throughput comprises to determine a first network socket throughput for the first network socket;
wherein to determine the interrupt rate comprises to determine a first interrupt rate for the first network socket based on the determined first size parameter and the first network socket throughput;
wherein the communication module is further to receive a second network packet from the remote computing device via a second network socket;
wherein the interrupt rate determination module is further to (i) examine a header field of a transport layer protocol data unit of the received second network packet to determine a second size parameter, (ii) determine a second network socket throughput for the second network socket, (iii) determine a second interrupt rate for the second network socket based on the determined second size parameter and the second network socket throughput, and (iv) determine an aggregate interrupt rate for the first and second network sockets based on the determined first and second interrupt rates; and
wherein to generate the interrupt comprises to generate the interrupt based on the determined aggregate interrupt rate for the first and second network sockets to allow processing of the first and second network packets.

7. The local computing device of claim 6, wherein to determine the aggregate interrupt rate comprises to determine the aggregate interrupt rate based on a determination of a lesser of the first interrupt rate and the second interrupt rate.

8. The local computing device of claim 6, wherein to determine the aggregate interrupt rate comprises to determine the aggregate interrupt based on an average of the determined first and second interrupt rates.

9. The local computing device of claim 6, wherein the interrupt rate determination module is further to weight at least one of the first or second interrupt rates based on a socket type of the first or second network sockets.

10. One or more non-transitory machine-readable media comprising a plurality of instructions stored thereon that in response to being executed by a local computing device, cause the local computing device to:
  receive a network packet from a remote computing device;
  transmit a separate network packet to the remote computing device;
  examine a transmission control protocol header of a transmission control protocol segment of the received network packet to determine a receive window size of the remote computing device;
  examine a transmission control protocol header of a transmission control protocol segment of the transmitted network packet to determine a receive window size of the local computing device;
  determine a lesser of the receive window size of the remote computing device and the receive window size of the local computing device;
  determine a network socket throughput between the local computing device and the remote computing device based on communications between the local computing device and the remote computing device;
  divide the determined lesser receive window size by the determined network socket throughput to determine an interrupt rate; and
  generate an interrupt based on the determined interrupt rate to allow processing of the network packet.

11. The one or more non-transitory machine-readable media of claim 10, wherein the plurality of instructions further cause the local computing device to:
  store a window scale factor for each of the local and remote computing devices; and
  increase the receive window size of the remote computing device and the window size of the local computing device as a function of the window scale factor of each of the local and remote computing devices.

12. The one or more non-transitory machine-readable media of claim 11, wherein the plurality of instructions further cause the local computing device to establish a transmission control protocol socket between the local computing device and the remote computing device; and
  wherein the network packet received from the remote computing device and the separate network packet transmitted to the remote computing device are transmitted to and received from the remote computing device as a function of the establishment of the transmission control protocol socket between the local computing device and the remote computing device.

13. The one or more non-transitory machine-readable media of claim 10, wherein the plurality of instructions further cause the local computing device to:
  examine a user datagram protocol segment header of a user datagram protocol segment to determine a datagram length of the user datagram protocol segment; and
  determine a separate interrupt rate based on the determined datagram length of the user datagram protocol segment and a separate network socket throughput.

14. The one or more non-transitory machine-readable media of claim 10, wherein the plurality of instructions further cause the local computing device to:
  determine a maximum throughput of the network socket based on historical communications between the local computing device and the remote computing device;
  determine a current throughput of the network socket based on current communications between the local computing device and the remote computing device; and
  wherein to determine the network socket throughput comprises to determine the network socket throughput based on a determination of a greater of the maximum throughput and the current throughput of the network socket.

15. The one or more non-transitory machine-readable media of claim 10, wherein to receive the network packet comprises to receive a first network packet from the remote computing device via a first network socket;
  wherein to determine the receive window size comprises to determine a first size parameter;
  wherein to determine the network socket throughput comprises to determine a first network socket throughput for the first network socket;
  wherein to determine the interrupt rate comprises to determine a first interrupt rate for the first network socket based on the determined first size parameter and the first network socket throughput;
  wherein the plurality of instructions further cause the local computing device to (i) receive a second network packet from the remote computing device via a second network socket, (ii) examine a header field of a transport layer protocol data unit of the received second network packet to determine a second size parameter, (iii) determine a second network socket throughput for the second network socket, (iv) determine a second interrupt rate for the second network socket based on the determined second size parameter and the second network socket throughput, and (v) determine an aggregate interrupt rate for the first and second network sockets based on the determined first and second interrupt rates; and
  wherein to generate the interrupt comprises to generate the interrupt based on the determined aggregate interrupt rate for the first and second network sockets to allow processing of the first and second network packets.

16. The one or more non-transitory machine-readable media of claim 15, wherein to determine the aggregate interrupt rate comprises to at least one of (i) determine the aggregate interrupt rate based on a determination of a lesser of the first interrupt rate and the second interrupt rate or (ii) determine the aggregate interrupt based on an average of the determined first and second interrupt rates.

17. The one or more non-transitory machine-readable media of claim 15, wherein the interrupt rate determination module is further to weight at least one of the first or second interrupt rates based on a socket type of the first or second network sockets.

18. A method for generating an interrupt for processing incoming network packets, the method comprising:
  receiving, by a local computing device, a network packet from a remote computing device;
  transmitting, by the local computing device, a separate network packet to the remote computing device;
  examining, by the local computing device, a transmission control protocol header of a transmission control protocol segment of the received network packet to determine a receive window size of the remote computing device;
  examining, by the local computing device, a transmission control protocol header of a transmission control protocol segment of the transmitted network packet to determine a receive window size of the local computing device;

determining, by the local computing device, a lesser of the receive window size of the remote computing device and the receive window size of the local computing device;

determining, by the local computing device, a network socket throughput between the local computing device and the remote computing device based on communications between the local computing device and the remote computing device;

dividing, by the local computing device, the determined lesser receive window size by the determined network socket throughput to determine an interrupt rate; and generating, by the local computing device, an interrupt based on the determined interrupt rate to allow processing of the network packet.

19. The method of claim 18, further comprising examining a user datagram protocol segment header of a user datagram protocol segment to determine a datagram length of the user datagram protocol segment; and determining a separate interrupt rate based on the determined datagram length of the user datagram protocol segment and a separate network socket throughput.

20. The method of claim 18, wherein receiving the network packet comprises receiving a first network packet from the remote computing device via a first network socket;

wherein determining the receive window size comprises determining a first size parameter;

wherein determining the network socket throughput comprises determining a first network socket throughput for the first network socket;

wherein determining the interrupt rate comprises determining a first interrupt rate for the first network socket based on the determined first size parameter and the first network socket throughput; and further comprising:

receiving, by the local computing device, a second network packet from the remote computing device via a second network socket;

examining, by the local computing device, a header field of a transport layer protocol data unit of the received second network packet to determine a second size parameter;

determining, by the local computing device, a second network socket throughput for the second network socket;

determining, by the local computing device, a second interrupt rate for the second network socket based on the determined second size parameter and the second network socket throughput;

determining, by the local computing device, an aggregate interrupt rate for the first and second network sockets based on the determined first and second interrupt rates; and wherein generating the interrupt comprises generating the interrupt based on the determined aggregate interrupt rate for the first and second network sockets to allow processing of the first and second network packets.

\* \* \* \* \*